Figure 2:
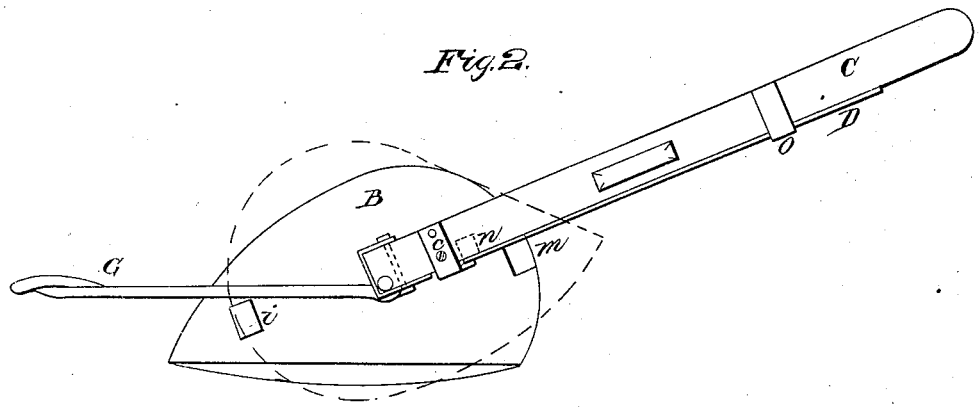
Figure 2:
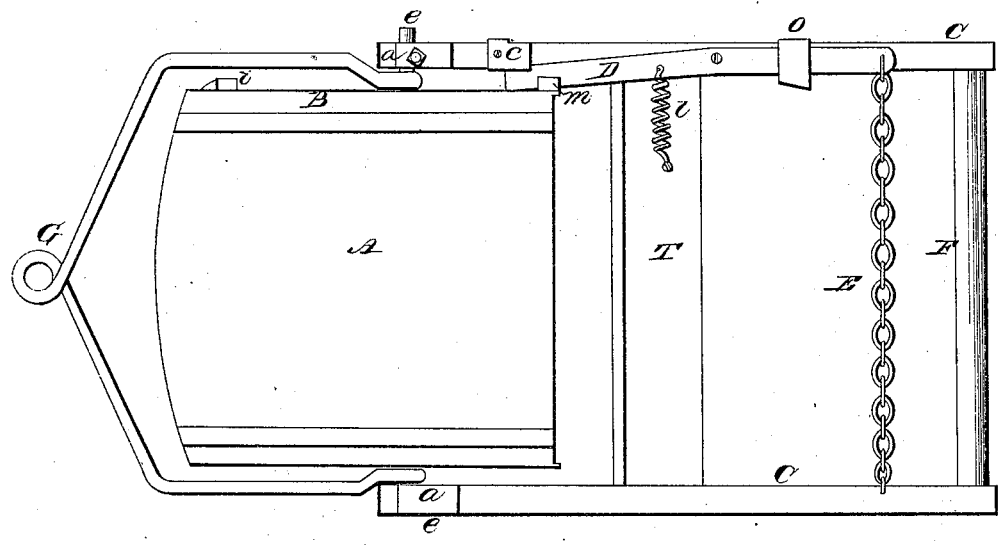

J. F. Winchell.

Road Scraper.

N° 84,330.  Patented Nov. 24, 1868.

Witnesses:
P. J. Dodge.
N. L. Woods.

Inventor:
J. F. Winchell
by Dodge & Munn
his attys

JESSE WINECOFF, OF BERLIN, PENNSYLVANIA.

Letters Patent No. 84,331, dated November 24, 1868.

IMPROVEMENT IN HAND-PLOWS.

The Schedule referred to in these Letters Patent and making part of the same.

Be it known that I, JESSE WINECOFF, of Berlin, Somerset county, State of Pennsylvania, have invented a new and improved Mode of Constructing Hand-Plows for cultivating gardens and small lots; and I do hereby declare that the following is a full and exact description thereof, reference being had to the accompanying drawings, and to the letters of reference marked thereon.

The nature of my invention consists in combining a large double propelling-wheel, going before, and a plow-fixture, which swings freely; by iron strips, connected with the wheel by the ends of the axle, as pivots, which combination results in several decidedly advantageous features, as, for example, the plow is entirely under the control of the operator, working with mathematical precision, and all the simplicity of a common wheelbarrow, the shovel invariably following the wheel wherever it is pushed. The shovel is not liable to "jump out," but goes on doing its uniform work, unaffected by the ups and downs, &c., of the wheel. The wheel, being double, travels equally on all kinds of ground, whether level, a furrow, a sharp ridge, or an edge.

The final effect of this combination is a much more reliable and useful article than any machine yet submitted to the public.

To enable mechanics to make and use my invention, I will proceed to descsibe it more in detail.

No. 1 is the wheel, thirty inches high, with spokes and rim, on a turned hub, five inches thick and six inches long; two similar wheels, being set, one on each end of the hub, making a double wheel—wood.

No. 2 are wooden side strips, bolted to the beam, and holding the wheel by a bolt or axle.

No. 3 is a wooden beam, four feet long, two by three inches thick, with a mortise at $a$, for the tenon $b$ to slide in.

No. 4 is a transverse lever or handle, two feet long, to push by, either with hands or hands and body.

No. 5 is a slender elastic spring, (wooden,) with a mortise, $b$, which puts a slight pressure, if needed, on the plow-fixture, without interfering with the free motion of the shovel-part.

No. 6 is a long tenon, with pin-holes and pins, 7, to change up and down at pleasure, the upper pin being always on top of the beam, to lift the plow by, &c.

No. 7, string connecting the iron pins.

No. 8 is the plow-stock, two by three inches, circular, to correspond with shape of wheel.

No. 9 are iron strips, riveted on wood at one end, and running forward, on each side of the wheel, to the axle, being bent to suit the width of the wheel.

No. 10 is the iron shovel, eight by five inches, rounded backward to nearly a semicircle, and well pointed.

No. 11, a short piece of wood, framed into the stock.

Whilst I have invented the whole plow, in all its parts,

What I claim as new, and desire to secure by Letters Patent, is—

The combination of two wheels, 1, going before, and a single plow, 10, together with a pivoted and adjustable beam, 3, and spring, 5, arranged in the manner described, and for the purpose set forth.

JESSE WINECOFF.

Witnesses:
J. N. FICHTNER,
J. P. PHILSON.